/

US006954765B2

(12) United States Patent
Spiegel

(10) Patent No.: US 6,954,765 B2
(45) Date of Patent: Oct. 11, 2005

(54) UPDATING A FILE IN A FRAGMENTED FILE SYSTEM

(75) Inventor: Christopher J. Spiegel, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 449 days.

(21) Appl. No.: 09/751,545

(22) Filed: Dec. 30, 2000

(65) Prior Publication Data

US 2004/0073582 A1 Apr. 15, 2004

(51) Int. Cl.[7] ............................................... G06F 12/00
(52) U.S. Cl. .................................... 707/200; 711/103
(58) Field of Search ................................ 707/200, 204, 707/205; 711/103, 134, 170–173, 165; 370/394–397, 402–418; 713/2; 365/230.1

(56) References Cited

U.S. PATENT DOCUMENTS 5,822,759 A * 10/1998 Treynor ...................... 711/134
6,226,728 B1 * 5/2001 See et al. .................... 711/171
6,401,160 B1 * 6/2002 See et al. ........................ 711/5
6,571,326 B2 * 5/2003 Spiegel et al. .............. 711/170
6,614,709 B2 * 9/2003 Spiegel et al. ......... 365/230.01
6,622,200 B1 * 9/2003 Hasbun et al. .............. 711/103
6,711,675 B1 * 3/2004 Spiegel et al. ................. 713/2

* cited by examiner

Primary Examiner—Uyen Le
Assistant Examiner—Te Yu Chen
(74) Attorney, Agent, or Firm—Blakely, Sokoloff, Taylor & Zafman LLP

(57) ABSTRACT

The present invention provides for reliably updating a file by making a backup copy of the portion of a file that includes changed data. The revised portion of the file is related to the other file portions through cross-linking of units. Upon completely updating the file and linking the data, old data is deleted. Thus, an entire file need not be duplicated for backing up an update. Furthermore, progress of the update may be tracked by marking the backup copy during the update process. The portions of a data object for the file may be mapped by marking a unit as valid if the data contained therein is current and linked if the unit is related to other portions of the file. In addition, other aspects of the present invention relating to the storage system updating a fragmented file are described.

30 Claims, 10 Drawing Sheets

UPDATING A FILE IN A FRAGMENTED FILE SYSTEM

CROSS-REFERENCED RELATED APPLICATIONS

This application is a related to U.S. patent application Ser. No. 09/675,578, entitled, "INCREASED RELIABILITY OF DATA STORED ON FLASH MEMORY IN APPLICATIONS SENSITIVE TO POWER-LOSS" filed on Sep. 29, 2000, and U.S. patent application Ser. No. 09/063,954, entitled, "DYNAMIC ALLOCATION FOR EFFICIENT MANAGEMENT OF VARIABLE SIZED DATA WITHIN A NONVOLATILE MEMORY," filed on Apr. 21, 1998, which has issued as U.S. Pat. No. 6,226,728.

FIELD OF THE INVENTION

The present invention relates generally to updating of computer memory storage systems. In particular, this invention is draw to reliably updating a file of a fragmented file system with changed data.

BACKGROUND

There are many devices that need to store information, such as data and code, in memory and other forms of nonvolatile storage, which need to periodically make updates. Such devices include, without limitation, a variety of computer systems, telecommunication devices, components of other devices, networking devices, memory cards, navigation devices, and the like.

In situations where the data stored in memory on such devices must be updated, it is important to employ a storage medium that is reprogrammable within the system. For example, storage systems used to hold data, such as file systems, databases, etc. may require modification. Storage mediums that are unable to be reprogrammed in the system, such as read-only memory (ROM) or EPROM to accommodate changes require a replacement of the storage medium.

A flash electrically erasable programmable read only memory (Flash EEPROM), hereinafter "flash memory" can be reprogrammed after being erased in-system. Flash memory may be erased in units of memory called blocks having memory cells and may be reprogrammed in bytes, words or double words. In order to erase one cell, an entire block of cells must be erased.

Devices that have updateable storage are susceptible to any failure occurring during the process of updating the files. For example, a power-loss may occur, such as a battery or charger that supplies energy to the device may run out of power. When power is lost during updating a file before the new version of the file has been completely written, the file may become corrupt and the data within the file left in an unusable state. The file will no longer be the original file or the final file. The device cannot recover by using the original file data because the old data might have been deleted or modified with a portion of the changed data. Thus, some prior upgrade processes are inherently unreliable because of the inability to return to a former valid state if an error occurs while updating to the new state. A reliable updating method on the other hand, is tolerant to such disruptions to the updating process.

Attempts to provide reliable updating of files typically require a backup copy of an entire file to be generated prior to changing the file. The backup copy restores the original if the file being updated becomes corrupted However, a problem with these prior methods is that the backup copy of the whole file needlessly consumes storage space equivalent to the original, where only a smaller portion of the data file may need to be added or modified Generally, the amount of storage available for maintaining a full copy is limited in devices that have data files comprising significant portions of the total storage available.

In general, the shortcomings of the currently available methods for modifying files are inadequate for providing reliable updates. In particular, previous methods require enough storage space for complete backups for the file(s) being updated.

BRIEF DESCRIPTION OF THE DRAWINGS

The present invention is illustrated by way of example, and not limitation, in the figures of the accompanying drawings in which:

FIGS. 3A–3C are block diagrams of one exemplary storage system having a tree structure, wherein FIG. 3A shows chains of sequence tables pointing to fragments prior to data updating, FIG. 3B shows one configuration of the sequence tables cross-linked to changed data, and FIG. 3C shows another configuration of the sequence tables cross-linked to changed data, in accordance with the teachings presented herein.

FIGS. 5A–5C are diagrams illustrating the various steps in specific methods of updating a file with labeled units, wherein FIG. 5A shows overwriting data in units, FIG. 5B shows truncating units and FIG. 5C shows appending a data object with changed data.

DETAILED DESCRIPTION

Figure 1:
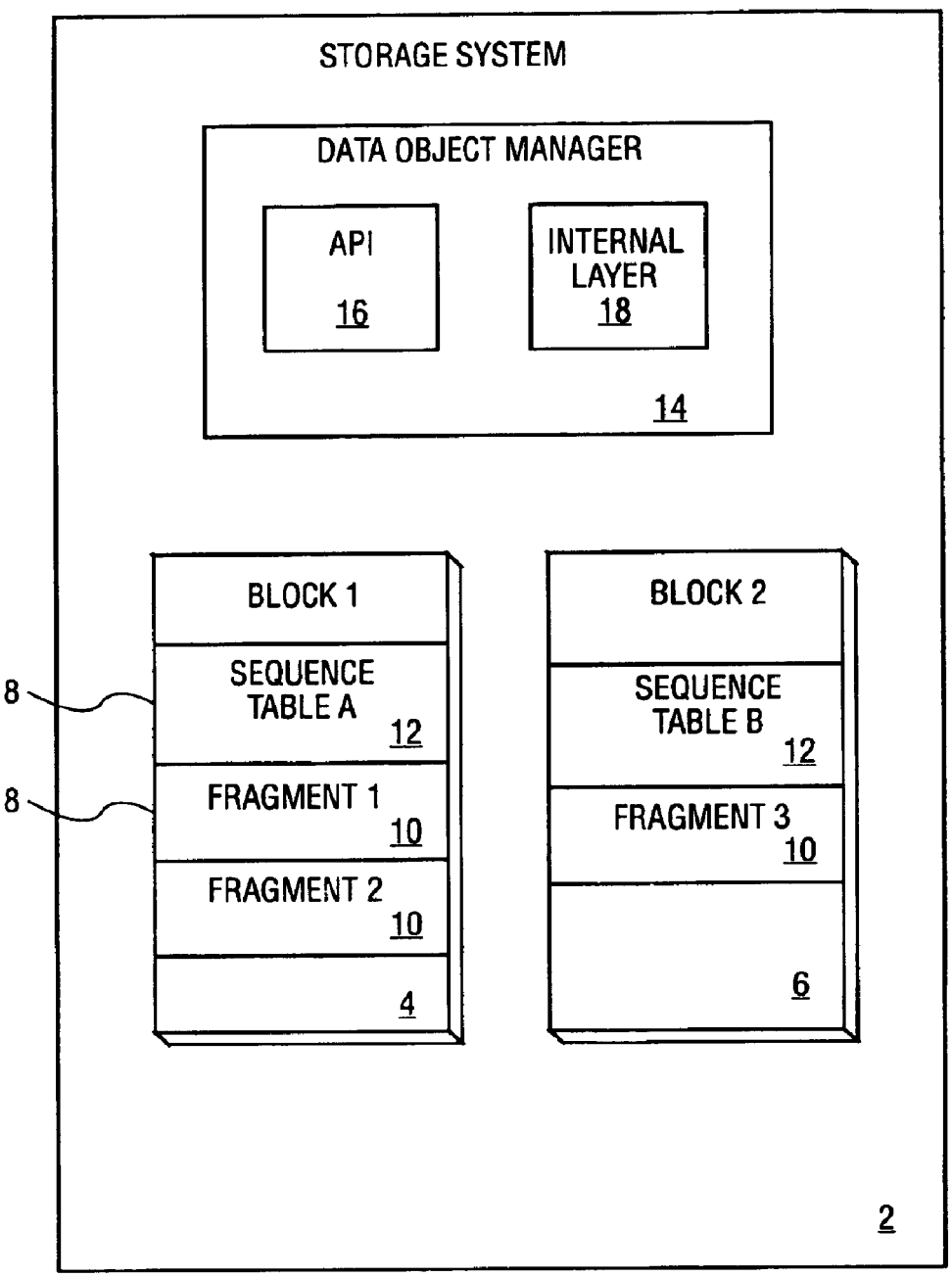
FIG. 1 is a block diagram illustrating one embodiment of a storage system in which a file may be updated, in accordance with the teachings presented herein.

The present invention provides for updating a file by making a backup copy of a portion of the file that includes changed data. Through cross-linking of certain storage areas, called units, the revised segment of the file is related to the other file portions In one embodiment of the updating procedure, the changed data may involve a replacement of some of the original data with new data via an overwriting procedure. In other circumstances, the changed data in a file may also include adding data to the file by appending new data onto existing data. Furthermore, the changed data may entail truncating a file portion. Usually, once the changed data has been created, the old data is deleted. According to these procedures, changed data may be easily included in a file in a manner that conserves storage space compared to prior procedures for reliable updating that require duplicating the entire file.

Moreover, the present invention permits tracking of the progress of an updating procedure by attaching various labels to the units that indicate the status of revisions being made to the unit. For example, a unit may be marked as a backup copy during the update and unmarked after the update is completed. If the procedure becomes interrupted, the label is used to determine whether to restore the original unit or to keep the current unit. Once the determination to delete a unit has been made, the unit may be marked as invalid and the unit space will become available for new units.

Various status labels may also assist in relating all portions together. A unit that has been newly formed may be labeled as unlinked to signify that the unit has not yet been linked to any parent data unit. Units may be marked as linked if the unit is related to portions of the file through cross-links with other units. A linked unit may transition through several states during the updating process, e.g. truncate, overwrite or discarding. Where an updating procedure fails, the status labels may be used to determine the appropriate members of a storage system structure having proper data.

The storage system employing the methods of updating files according to the present invention may be any of a variety of storage means, such as flash memory, magnetic disk, a magneto-optical disk or other read/write storage medium used to hold code, a database, files, or other data. These storage systems listed are by way of example and are not intended to limit the choice of storage that are or may become available in the data storage field, as described herein.

The storage system is useful in numerous devices having data that may need to be updated. Such devices include a variety of computer systems, e.g. desktop computers, laptop computers, etc. The storage system may be used in telecommunication devices, e.g. digital cellular telephones, personal digital assistants, pagers, digital cameras, digital set-top boxes, other wireless devices, etc. Furthermore, some components of other devices may find the storage system convenient, e.g. embedded controllers. Other devices include networking devices, e.g. LAN switches; memory cards, e.g. PC cards; navigation devices, e.g. global positioning system receiver and base stations; and other such devices. The device includes a processor that may be directed to carry out the reliable updating processes as described herein, and according to the present invention.

The present invention uses a fragmented file structure, where a data object manages the multiple portions of a complete file. A data object is a data structure that uses sequence tables and data fragments to create data containers capable of holding non-contiguous data of any size. The base storage system has areas of memory called units that hold certain data related to the data object. A minimum amount of space that can be allocated to write data, referred to as the unit granularity, may be established for a given unit. For example, the granularity may be 1 byte, 2 bytes, 4 bytes, 16 bytes, or 32 bytes and typically up to 1 KB or 4 KB.

In a given storage system, the data objects, the units used to construct a data object and data structures contained within a unit are manipulated by a data object manager, according to the updating processes described herein. FIG. 1 illustrates on exemplary storage system 2 having a data object manager 14. The data object manager may direct a processor to conduct the various reliable updating procedures. The data object manager 14 may include an internal layer 18 to provide the routines needed to support reading, writing, creating, deleting, overwriting, truncating and otherwise modifying of sequence tables and fragments. A data object application programming interface (API) 16 may also be present to abstract the fragmented data object as a contiguous data store and to interface with all external functions from the device and/or call the appropriate internal layer.

The units provided in a storage system may be of various types, which contain different information. One type of unit, referred to as a fragment, contains a portion of contiguous data for a larger data object. Collectively, the data in multiple fragments comprise an entire data object.

Another type of unit is a sequence table unit that contains a sequence table 12. A sequence table is an array of entries having information to locate other units, for use alone or in combination with other sequence tables, in determining the location of the fragments of a data object The sequence tables connect the fragments together in the proper order according to the original data. By accessing the units pointed to by sequence tables in the order indicated by the sequence tables, the entire data object can be sequentially read or written, even though the actual data fragments may be scattered randomly across the media. Typically, each sequence table consumes only a small amount of space in memory, e.g. 256 bytes, compared to the total amount of data contained within the data object.

In general, the units of the storage system may be arranged and related to each other in various fashions, such as a database format using look-up tables and/or handles to form a particular storage system structure. In one embodiment, these units are contained within blocks in the storage system, as illustrated in the exemplary storage system in FIG. 1. The storage system 2 has multiple blocks 4 and 6 for storing different types of units 8, including fragments 10 and sequence table units 12. Each block may also include a block information structure that may include various information related to the block, such as an identification number for the block, the status of units contained within the block, and/or other information that assists in erasing a block. Where the storage system is flash memory, each of these blocks is individually erasable.

Along with the data in the units, there is certain header information associated with each unit to specify information related to the unit and data structure contained therein. Each of the information may be stored in separate fields or combined into one or more fields. For example, the information may include labels describing the unit as a backup copy, linked, invalid, discarding, valid and/or invalid, as well as specifying the unit's size and location within the media.

Figure 2A:
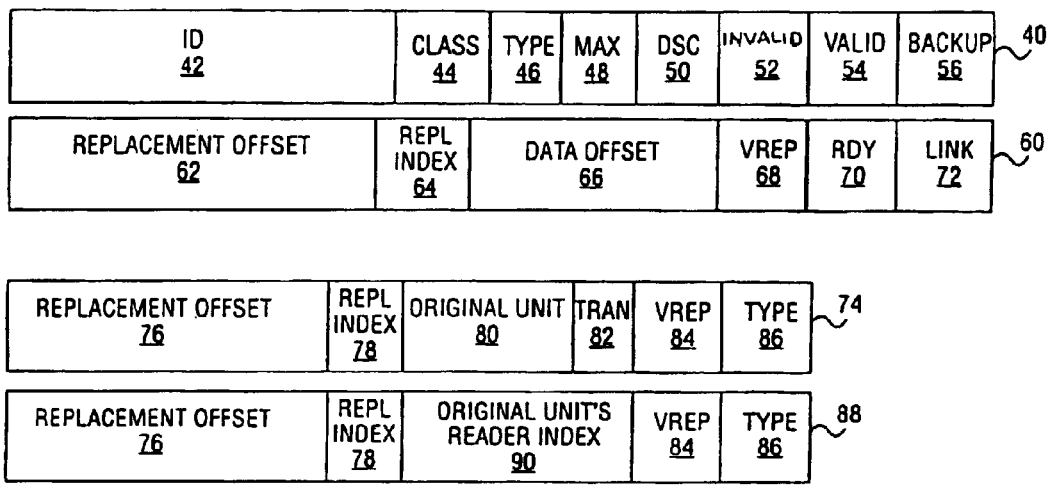
FIG. 2A is a block diagram of one various exemplary unit headers and FIG. 2B is a block diagram of sequence table entry, in accordance with the teachings presented herein.

FIG. 2A shows an example of unit headers 40, 60 having a plurality of fields to identify and describe the unit. The unit header 40 has an ID field 42 into which a unique identifier for the unit is entered.

Some of the fields in a unit header are for categorizing the unit by kind. A unit header may include an optional class field 44 that has a value representing a predefined class for use to recognize a unit, alone or with the unit identifier value. For example, values may be designated to represent each unit having static information, dynamic information, auxiliary information, a file's primary data, a directory's primary data, registry data, etc. Also, provided in the unit header may be a type field 46 to indicate the type of unit relative to the data structure contained therein. Examples of types include fragments and sequence tables in various levels, e.g. level 1, level 2, level 3, etc. Another optional field in the unit header is a maximum (MAX) field 48 to specify the maximum size of the unit.

In addition, the unit may include various status information indicating the state that the unit is in at any point in time, e.g. during an update process, and assists the data object manager in mapping the overall data object. By the use of status information, the data object manager may determine which units contain the proper data comprising the storage system structure for a data object. Such status fields may include a discarding (DSC) field 50 to mark that the data object is in the process of being deleted, so that a data object may delete all of the units in a storage system structure associated with the data object. A valid field 52 denotes whether the data within the unit is valid and useable information. An invalid field 54 marks a unit as unusable.

The unit header also may include a value that indicates whether the unit is a backup copy during the updating process. A backup field 56 may be provided to store this backup indicator value. In other embodiments, the backup indicator may be stored in the other fields, such as class 44 or type 46. The backup indicator may be used to provide for reliable updating of data by signaling to the data object manager that the unit is a copy of an original unit and that the backup copy is in the process of having the data changed. After the data in a unit has been completely updated, the backup field signifies that the unit is no longer a backup copy, i.e. normal, and now replaces the original. However, where an updating procedure fails prior to its completion, the data manager may delete the backup copy and maintain the original unit In this manner, it is ensured that the stored data will not comprise the partially updated data from the backup copy. In case of an update failure, the data object manager may restart the update process using the original unit.

In some embodiments, a unit header 60 is also included in a unit having a replacement offset field 62 to provide the line position for replacement data within the unit and the replacement index (REPL INDEX) field 64 to indicate the point along the line, e.g. offset, in which the replacement is located. A data offset 66 is for providing the location of data within the unit, for example, so that the point where the header fields end and the data begins may be recognized. A valid replacement (VREP) field 68 is for stating if the information on the replacement data contained within header 60 is valid. A ready (RDY) field 70 is for specifying a header space that is ready for use, rather than a space for data storage. The link field 72 is to denote whether the unit is linked to another unit.

Further to a unit's composition, replacement data 74 may be provided to replace header information, especially where data is moved from one location to another and where the unit has been used during an update. The replacement data 74 usually includes values that pinpoint the location for the replaced data. A replacement offset field 76 is for specifying the line position of the replacement data 74, within the unit and a replacement index (REPL INDEX) field 78 to provide a location for the replacement data along the line indicated by the replacement offset field 76.

Some information within the replacement data 74 may assist the data object manager in mapping the portions of a data object. In the case where a handle to another unit is changed, such as by overwriting or truncating, the location of the original unit is stored in the original unit field 80. For example, where the units are stored in blocks, the block having the original unit may be identified. Furthermore, the transition (TRAN) field 82 indicates whether the unit is in a transition state, such as overwrite or truncate. The valid replacement (VREP) field 84 denotes a valid replacement data and type field 86 is for presenting the type of replacement data.

A replacement data 88 may be also provided with an original unit header index field 90 rather than an original unit field 80. This index field 90 may be referenced together with the value in the original unit field 80 to build a handle to the original unit, in instances that an updating procedure fails while in-progress.

The data object manager may utilize the various information in the unit headers and replacement data in relating the portions of the storage system structure of a data object before, during and after update. For example, when another unit contains a valid handle to a particular unit, the link value, e.g. in the link field 72, is present in the unit header. Where there is no such link to another data structure, such as when a unit is newly created, an unlinked state may be indicated. During an update process, a linked unit may transition to a truncated or overwritten in TRAN field 82 or discarding state in discarding field 52, indicating that the data in the previous unit (original unit) is no longer current and any handle referencing the previous unit needs to be updated to the new handle. To support the transitioning states, the unit may also contain information that indicates the original handle of the linked unit. Once an update is complete, the original unit is marked as invalid, e.g. unlinked, and the unit having the current data is linked and valid. In this manner, the data object manager may recognize which units are appropriate members of the storage system structure comprising a data object.

The labeling of a unit's state is useful in case of an interruption, e.g. power outage, occurring during a file updating procedure. The device may determine whether a unit has been successfully updated based on the unit's label. If an updating has been disrupted, the data object manager may determine the state of the entire data object, and decide whether to delete all units in the storage system structure associated with the data object, restore a backup if one exists, or to complete the data object as much as possible even though the data object may not have the proper original or intended contents. However, data objects that are valid and properly linked together may be preserved since its content apparently contains correct data.

During an update process, whereby only the new portions of the total data object are updated until the update is complete. At the time of completion, the new data is merged into the original data object and only the original portions of the data that had been updated are invalidated, i.e. deleted.

Moreover, marking of a unit as a backup copy identifies a particular unit of a storage system structure being changed. In case of update failure, the unit(s) having data that may include partial changed data and partial old data is automatically deleted and the original data maintained. In this manner, the updating procedure according to the present invention is reliably performed.

Figure 2B:
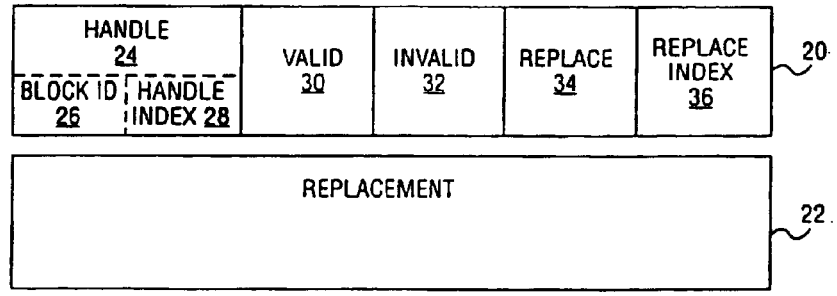

FIG. 2B shows an example of various entries 20, 22 that may comprise a sequence table. An array of any number of entries may be provided in a sequence table. The order of the entries in the sequence table indicates the order in which the fragments must be assembled for completing the data object.

Entry 20 has a handle 24 to reference the location of a targeted unit, e.g. either a fragment or other sequence table unit. The current handle for a unit in a sequence table is maintained and may be changed when data is written.

Each consecutive valid handle entry in a sequence table may point to the unit that contains the next piece of data relating to the data object in the storage system structure. The handle may also have information on both the unit's location within a larger space in the handle index field 28, e.g. the handle's physical offset within a block, as well as the identity of the space, e.g. block ID 26. However, in some cases, the data object manager 14, as shown in FIG. 1, may be provided for searching through the data units, e.g. block information structure, to locate the desired fragment or fragments. The sequence table may have any number of handles so that one or more than one unit may be referenced by the sequence table.

Each entry in the sequence table may also contain other convenient information in one or more description field in addition to the handle. An entry may have a valid field 30 and invalid field 32 for indicating if the correctness of the data contained within the entry. A valid value in valid field 30 indicates that the entry has a handle with a proper handle for a target unit for locating target unit, whereas an invalid value in invalid field 32 denotes that a handle in that entry contains non-current and unusable handle information.

In some embodiments of a sequence table, there may be extra sequence table entries called replacement entries. These entries are used to supercede the current directory, without requiring the entire table to be rewritten. In embodiments with replacement entries, the entry 20 may have a replaced field 34 for marking an entry as replaced In this case, an index in the replacement index field 36 is valid or invalid.

One or more replacement entry 22 may be provided that are without current data and are available for writing data into it. Oftentimes, the number of handle entries and replacement entries that a sequence table may have is consistent for each sequence table of a storage structure. For example, half of a sequence table may be populated with handle entries, e.g. thirty-two (32) handles, and the remaining half, e.g. thirty-two (32) replacements, may be set aside for replacement entries.

Since existing entries may not be able to be rewritten in the storage system, the replacement entry 22 provides a means to update a handle's location without having to invalidate the entire sequence table. Moreover, the replacement entry permits handles to be changed without having to necessarily rewrite the entire sequence table or block. This entry updating process may conserve considerable time. Without the use of the replacement entries, an entire table or block may need to be erased in order to change a small pointer, e.g. 4 bytes.

Whenever an entry in a sequence table is to be rewritten, an available replacement entry is located and the new entry information is written into the replacement entry. The replacement index of the new entry is written into the original, i.e. previous entry in the chain of entries. The original entry is marked as "replaced" and a value is saved in the entry pointing it to the new entry. While the replacement entry is being written, the original entry maintains a valid status. After a new entry is completed, the status of the new entry is labeled as valid and the prior entry is invalid. In this manner all changes are tracked and may be referenced in case the update procedure fails while in process.

Each sequence table may have a pre-determined maximum capacity of data that it may contain. This fixed size sequence table takes less time to make changes to entries as compared to a dynamically sized sequence table. As the size of a dynamic sequence table grows, so does the amount of time required to copy the sequence table when updating entries in the sequence table. The capacity may be based on a particular application for the storage structure, the level in which the particular sequence table is organized, and other factors. Once a maximum size of the sequence table is reached, another sequence table is used to contain data related to the original sequence table. In one embodiment, the sequence table is organized according to a hierarchical structure and a higher-level sequence table in the hierarchy may be used to contain the additional data. In another embodiment, a new sequence table is formed and associated to the initial sequence table by a group table. The group table connects all of the related sequence tables by handles that indicate the location of these related tables.

Multiple sequence tables are arranged to relate all fragments together. All of the sequence tables and fragments containing proper information for a data object comprise a storage system structure for the data object. In a storage system structure, there may be numerous variations of arrangements of units in different levels. Often, different assortments of sequence tables are categorized in hierarchical levels. A sequence table that points directly to a fragment is called an end sequence table, which is categorized into a level zero (base level). Some embodiments only include this single level structure.

Figure 3A:
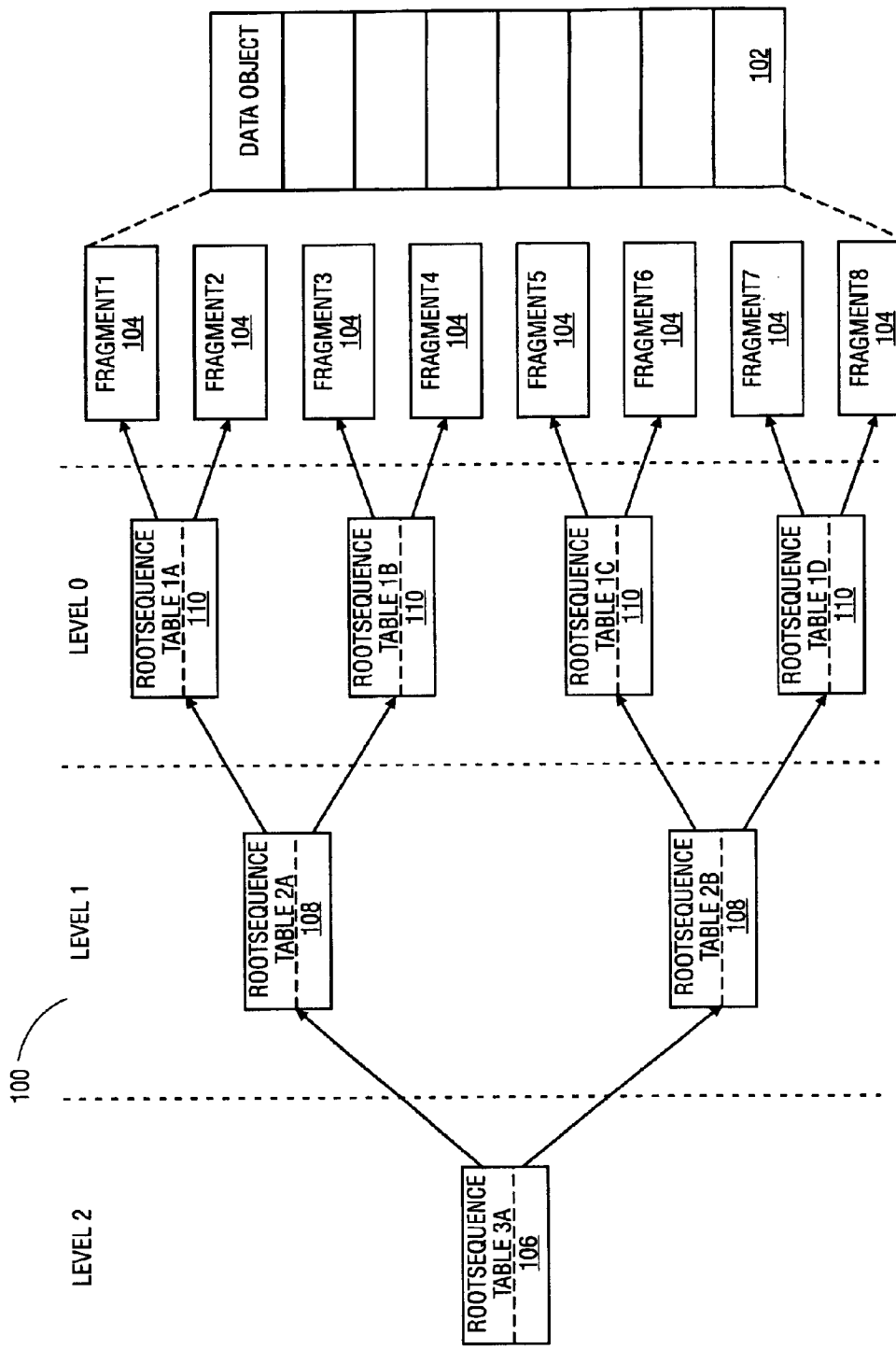

However, in other configurations of sequence tables, there are sequence tables grouped in more than one level. Any number of levels may be present, e.g. two, five, ten, etc., each of which contain sequence tables that reference one or more other sequence tables from different levels. FIG. 3A shows a tree configuration storage system structure 100 with chains of sequence tables each of which chain that leads to a fragment 104. Each fragment 104 is a portion of a data object 102.

A chain of tables often starts with a single root table 106 ranked into the highest level and referencing units in a lower level. The root table 106 as shown is in level two and has two valid handles. Each of the handles references a unit e.g. sequence table unit in level two. In general, storage systems may have a single root sequence tables with one or more handles.

An intermediate sequence table 108 is ranked into a level that is lower than the root sequence table level, but higher than the level zero. This intermediate sequence table, shown in level one, points to either end sequence table(s) 110 in level zero or to other immediate sequence table(s) 108 in a next lower level. However, where a storage system involves only two levels of sequence tables, only a root sequence table and end sequence table unit(s) are present without any intermediate sequence tables.

A fragment is located by starting at the root sequence table unit 106 and following each handle in the immediate sequence tables 108 to the end sequence table unit 110. Usually each fragment has a chain of tables such that the entire data object may be reconstructed by reading all of the chains of sequence tables. A sequence table that points to a lower level unit, i.e. child unit, is often called the parent unit for the child unit.

Figure 4:
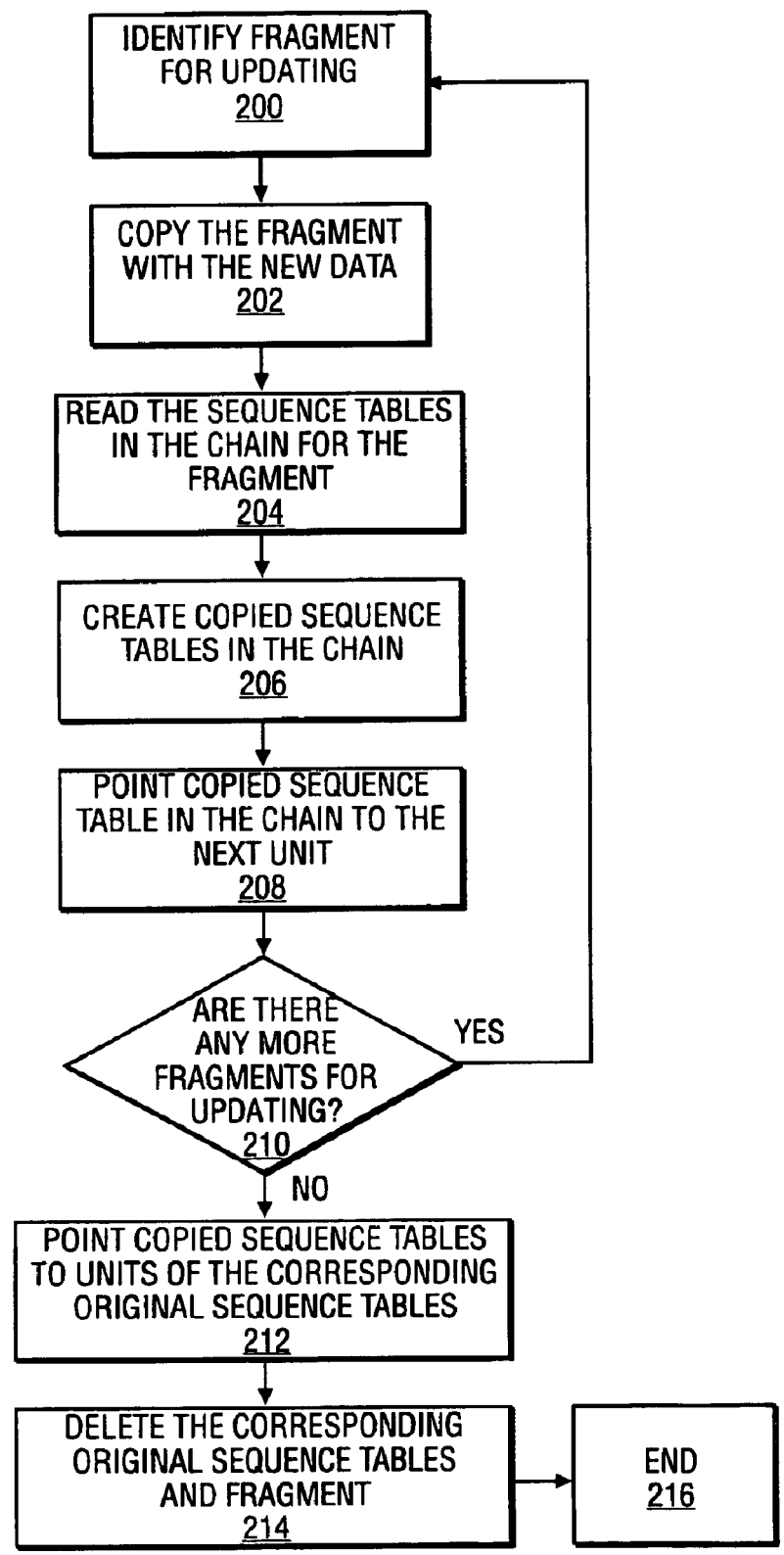
FIG. 4 is a flow chart depicting one method for updating a file with changed data.

The updating procedures may involve replacing data, i.e. overwriting, removing data, i.e. truncating or discarding, or adding data, i.e. amending. FIG. 4 is a flow chart showing one method of updating. A particular fragment that contains old data to be changed is identified 200. The old data may be the entire contents of the fragment or only part of the data contained within the identified fragment.

A backup copy of the identified fragment having the old data is made and data is changed, e.g. changed data is inserted in replace of the old data 202. Each sequence table in the chain for the identified fragment is read by starting with the root sequence table 204. Thus, the valid handle in the entry that references the next sequential unit, i.e. fragment or sequence table unit, is read. Each of these sequence tables in the fragment's chain is duplicated to create backup versions, i.e. copy sequence tables, and these copies are stored 206.

The chain of copied sequence tables are linked to each other, e.g. valid handles are written into an entry in the copied sequence table to reference the next copied sequence table in the chain 208. Thus, the new chain leads to the new fragment having the changed data rather than the old fragment with the old data. If any additional fragment is to be updated, the fragment is identified and the process repeats for this additional fragment until all fragments needing updated are manipulated according to the above-described procedure 210.

Valid handles for the copied sequence tables are written so that the copied sequence tables point to the appropriate original i.e. unaltered sequence tables and/or original fragments to complete the chains for the unaltered fragments 212. The original sequence table(s) and fragment(s) that have been copied are deleted from storage 214. The deletion may occur by various mechanisms. In one example of deletion, a fragment and sequence table may have their status modified from "valid" to "invalid." Such invalid units may then be available for subsequent writing. Another way in which a deletion may occur is by marking a unit as a backup copy and often also in a transition state, e.g. truncate, overwrite or discarding. Where updating is not completed, the backup copies may be either removed from storage or made available for subsequent writing. After deletion, the updating process may end 216.

Figure 3B:
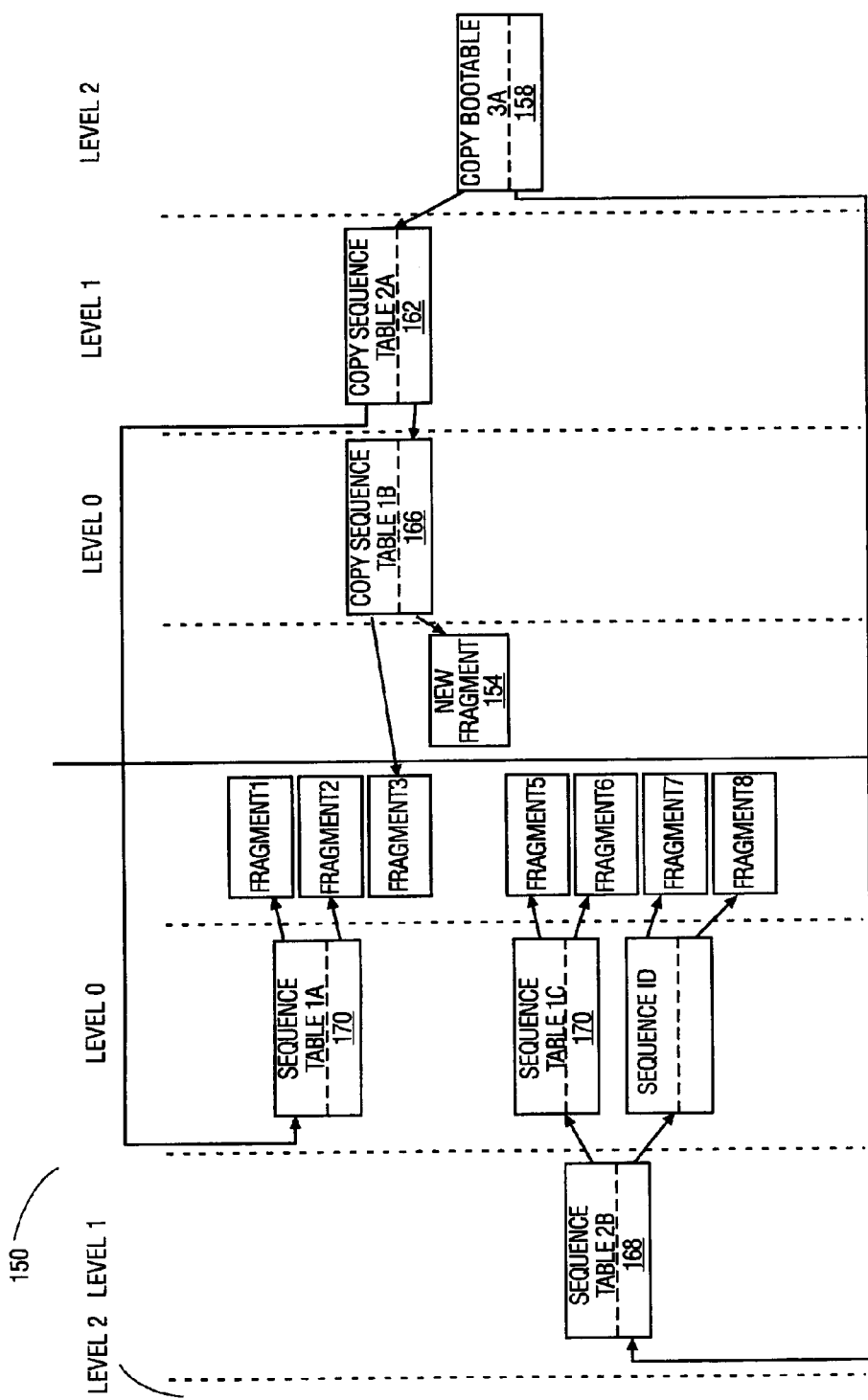

FIG. 3B, depicts an example of an updated storage system structure 150 for a data object of a file where Fragment 4 152 is targeted for an update procedure. Fragment 4 152 contains old data that has been replaced with changed data in New Fragment 4 154. The chain for Fragment 4 consists of Root Sequence Table 3A 156, Sequence Table 2A 160 and Sequence Table 1B 164. The backup copies are Copied Root Sequence Table 3A 158 corresponding to Root Sequence Table 3A 156; Copied Sequence Table 2A 162 corresponding to Sequence Table 2A 160 and Copied Sequence Table 1B 166 corresponding to Sequence Table 1B 164.

The duplicated sequence tables are made to reference to the appropriate original sequence tables in the chains. Thus, Copied Sequence Table 1B 166 points to New Fragment 4 154; Copied Root Sequence Table 3A 158 points to Sequence Table 2B 168, Copied Sequence Table 2A 162 points to Sequence Table 1A 170 and Copied Sequence Table 1B 166 points to Fragment 3 172. The original Root Sequence Table 3A 156, Sequence Table 2A 160 and Sequence Table 1B 164 and Fragment 4 152 are deleted from storage.

In alternative configurations of storage systems, only a single level of end sequence tables may be employed to point to fragment(s). This single level method proceeds by copying a targeted fragment of the data object to form a new fragment having changed data. A backup copy of the end sequence table that references the fragment is created. This end sequence table's valid handle is changed to reference the new fragment and the original end sequence table and original fragment are deleted as described above.

Figure 3C:
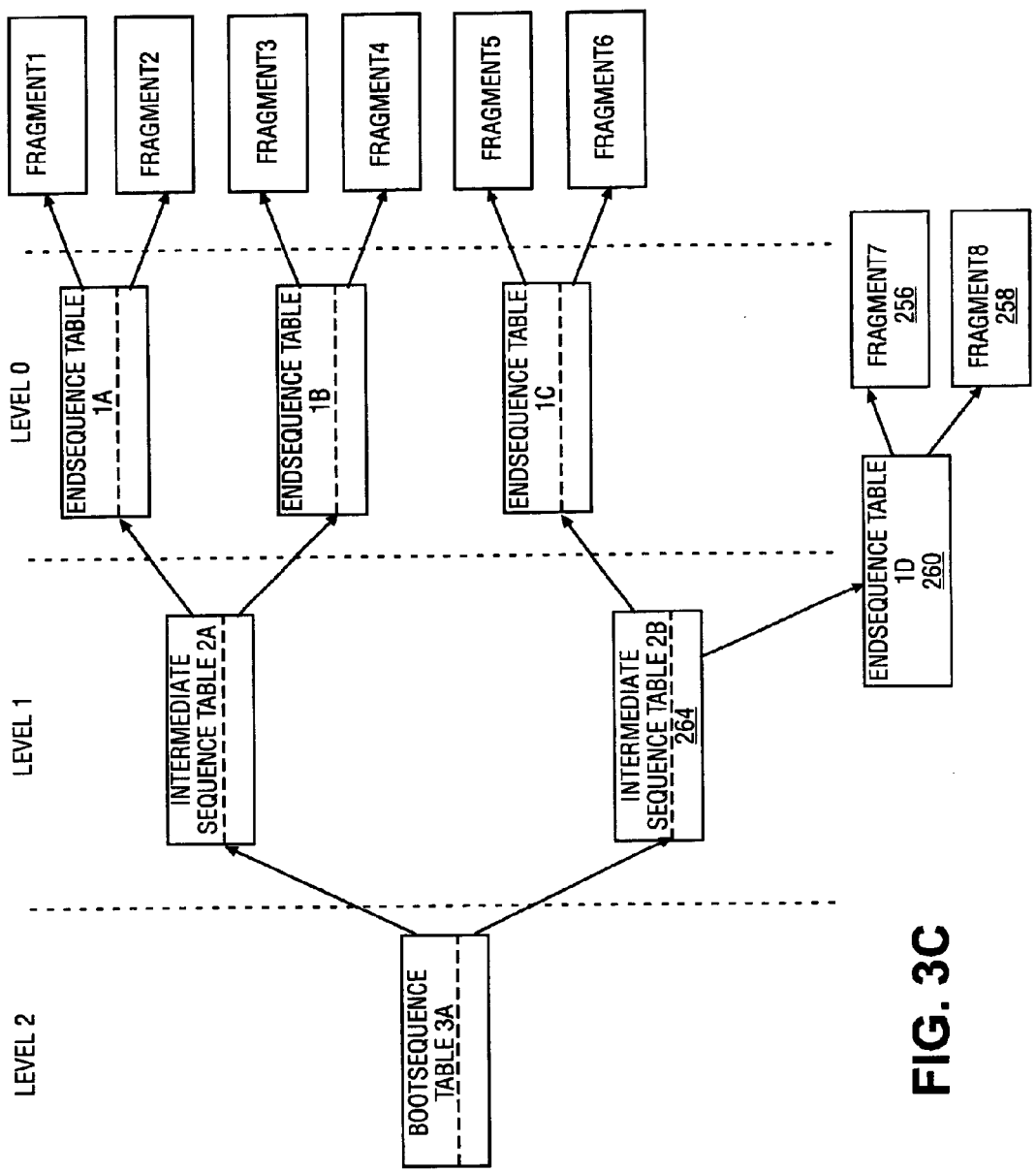

In another alternative embodiment a storage system that has multiple levels of sequence tables, a method of updating a file may be used in which only each end sequence table that references the fragment(s) having the updated changed data is copied. An example of a storage system structure 250 employing this reliable updating method is shown in FIG. 3C. Fragment 7 252 and Fragment 8 254 are identified as requiring updating and copied with the changed data as New Fragment 7 256 and New Fragment 8 258, respectively A backup Copy End Sequence Table 1D 260 is created from End Sequence Table 1D 262 and the valid handle of Intermediate Sequence Table 2B 264 is written to reference the Copy End Sequence Table 1D 260. The original Fragment 7 252, Fragment 8 254, and End Sequence Table 1D 262 are all deleted.

Figure 5A:
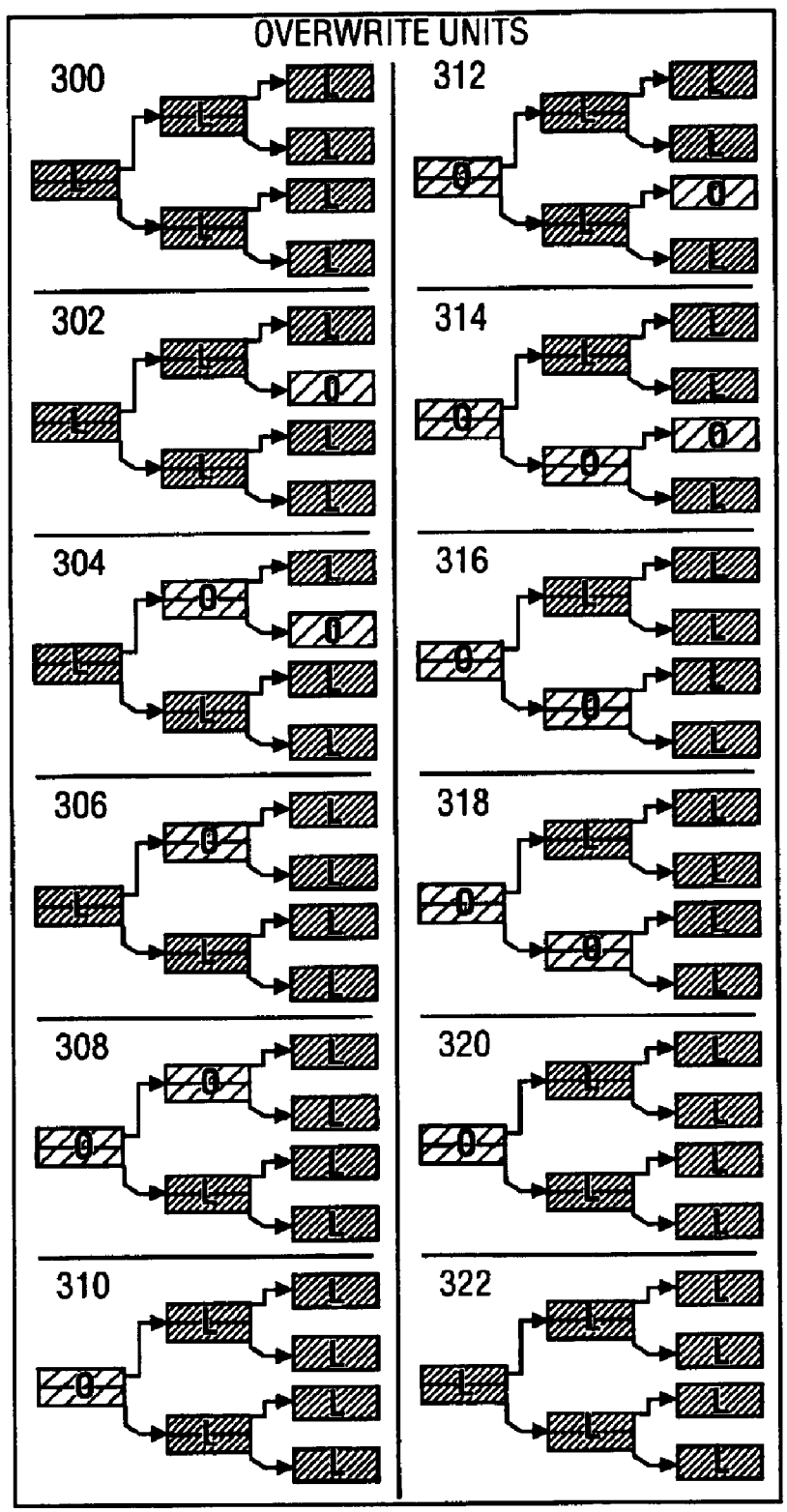

As described above, the use of linking labels assists in maintaining a data object as fragment portions in a fault tolerant manner. FIG. 5A shows a specific updating procedure to overwrite a fragment using link labels and overwrite transition state labels in a multi-level storage system. In this example, four fragments are linked together by three sequence tables in two levels 300. The overwriting begins in the second fragment, which is labeled as overwrite. The overwrite mark results in the link between the second fragment and its parent sequence table to become broken 302. The new location of the second fragment is written into its parent sequence table, causing the sequence table to be labeled as overwritten as well. Consequently, the link between this sequence table and the root table breaks 304. The link between the second fragment and its parent sequence table is reestablished and the second table is marked as linked again 306. This sequence table (now the child sequence table to the parent root sequence table) is reconnected to the root table by updating the root and resulting in the root sequence table to become unlinked in an overwrite state 308 The child sequence table is marked as linked, leaving the root sequence table unlinked 310.

The process repeats for the third fragment and the root table remains unlinked throughout the process 312 to 320. When all units are update, re-linked to its parent and labeled as such, the root sequence table is updated to connect the entire data object 322.

Figure 5B:
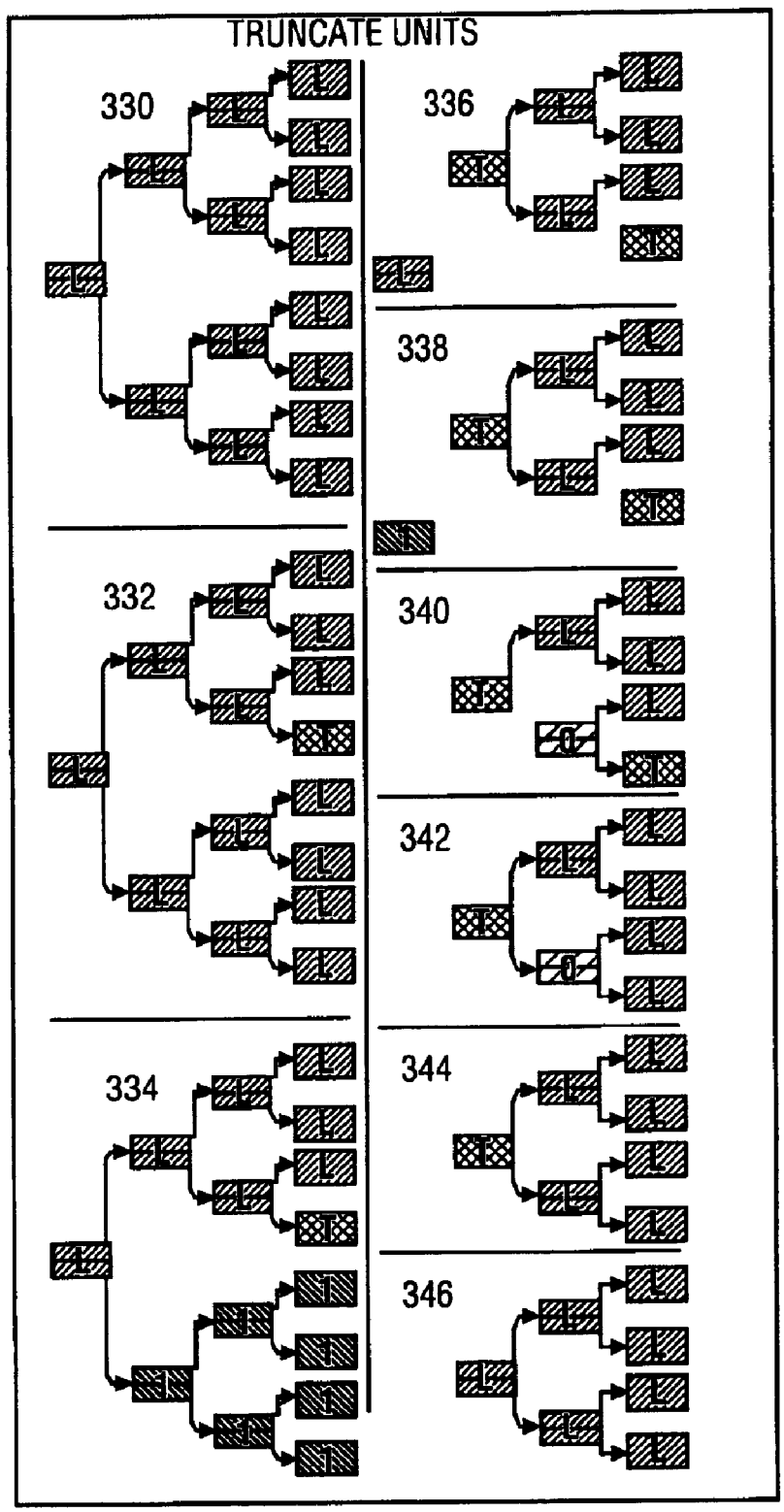

FIG. 5B depicts a method of updating for truncating data by use of linking labels and truncate transition state labels. The fourth fragment is identified for truncating 330. The point in the fragment where the data object is to end is identified and the fragment is labeled as a truncate state 332. Once the truncation point has been determined, fragments up to the truncation and their associated sequence tables, which are not linked to the truncated fragment, are deleted by marking them as invalid 334. This deletion step may occur by recursing down to the end fragment and deleting the units from the end until the truncated unit. If no truncated unit is specified, the entire data object may be deleted. The root table may be marked to discarding state prior to beginning this deletion, so that if the deletion process is interrupted, the root table labeled as discard will be deleted. The location of the new root is determined and truncated (as labeled) to the same size so that all links for the shortened data object may be reestablished 336. All sequence tables from the original root to the new root are deleted 338. The truncated data fragment is linked to its parent sequence table by updating the handle of the parent sequence table, resulting in the link from this sequence table to the root table to be severed and the parent sequence table to be marked as overwrite 340. With the truncated fragment linked to its parent, the fragment may be marked as linked 342. The link from this parent sequence table to the root table is updated in the root table and the parent sequence table labeled as linked 344. All other parent handles are updated and specified as linked to form the data object with changed data 346.

Figure 5C:
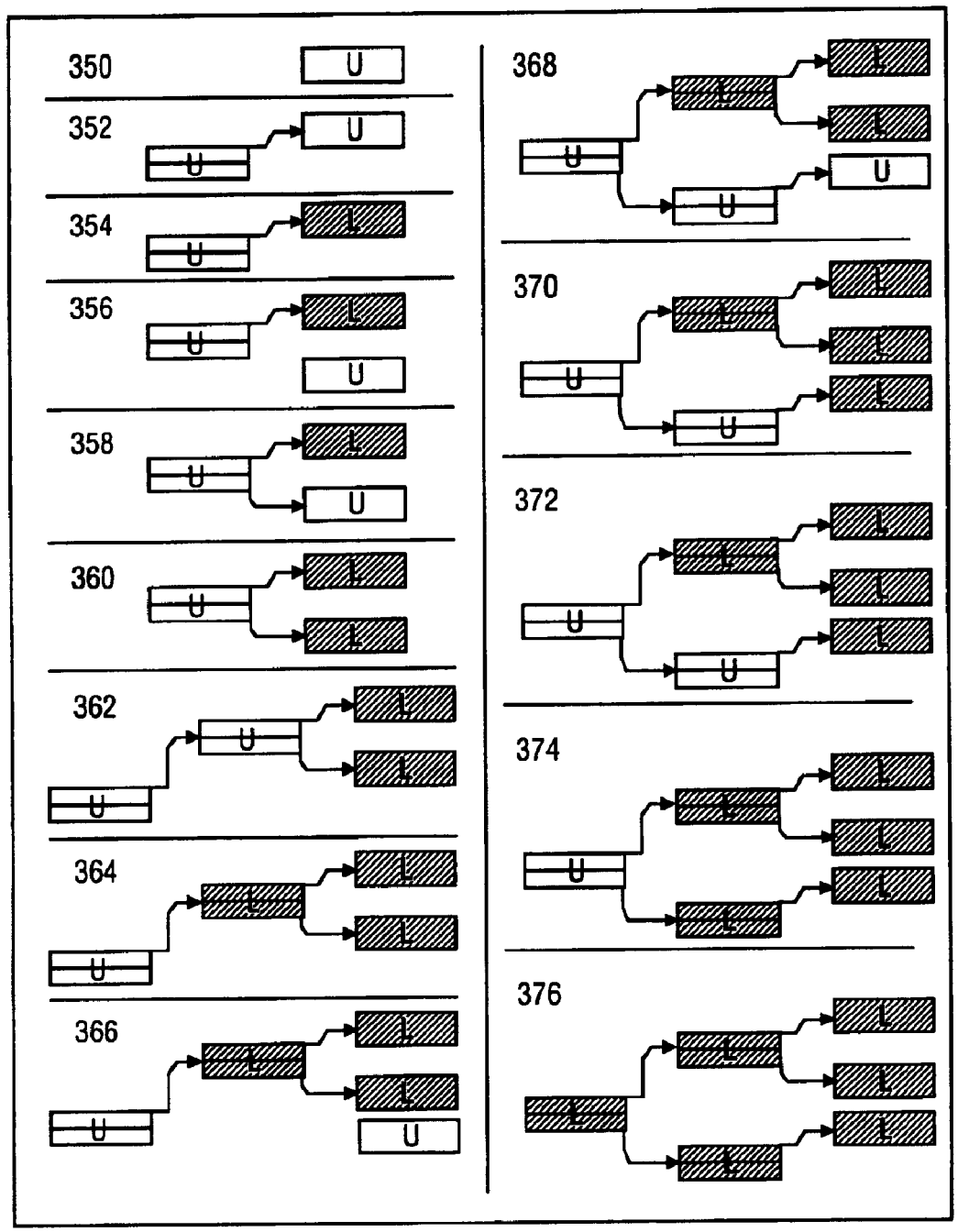

FIG. 5C illustrates another alternative embodiment of updating a file by appending changed data and using linked and unlinked labels for the various units, according to the present invention. The data unit may start as a single fragment 350. Once the data unit becomes larger than the single fragment, an end sequence table is created to link multiple fragments together 352. The handle for the fragment is written into a pointer in an entry of its parent sequence table. However, in some cases, a new sequence table is not created but rather a pointer is written into an entry of an existing end sequence table to reference the fragments. The child fragment may be then marked as linked 354. The next fragment is created 356 and the handle for this new fragment is written into an entry in its parent sequence table 358. The new child fragment is marked as linked 360.

However, the data unit may become too large for the sequence table in level one to support. In this instance, a new sequence table may be created into the next hierarchical level 362 with a pointer in an entry to the end sequence table. The end table unit may be marked as linked 364.

The appending procedure continues with the creation of a next fragment 366. A new sequence table is created to provide a link between the root table and the changed data fragment 368. With the fragment now linked to its parent, the fragment is marked as linked 370. The sequence table is then linked to its parent table, the root table 372 and marked as linked 374. At this point the amend procedure is complete. The function returns with a status indicating that the root table for the data unit has changed. Any other necessary pointers to the data unit may be updated. The root table is marked as linked 376.

Figure 6:
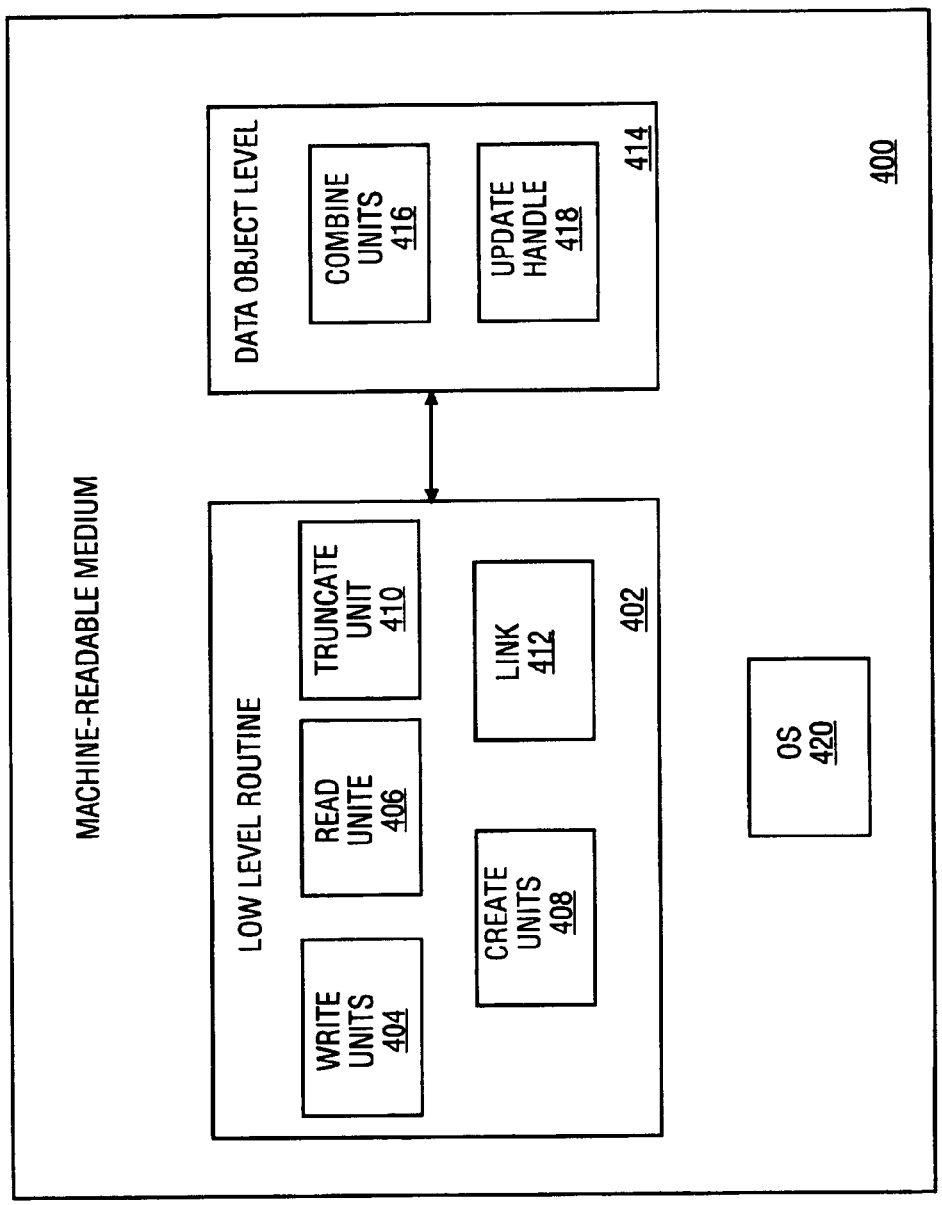
FIG. 6 is a block diagram of a machine-readable medium storing executable code and/or other data to provide one or a combination of mechanisms for updating files with changed data, in accordance with one embodiment of the present invention.

Various software components, e.g. applications programs, may be provided within or in communication with the system that cause the processor or other components of the device to execute the numerous methods employed in updating a stored file in a reliable manner. FIG. 6 is a block diagram of a machine-readable medium storing executable code and/or other data to provide one or a combination of mechanisms for updating a file in a storage system, according to one embodiment of the invention. The machine-readable storage medium 400 represents one or a combination of various types of media/devices for storing machine-readable data, which may include machine-executable code or routines. As such, the machine-readable storage medium 400 could include, but is not limited to one or a combination of a magnetic storage space, magneto-optical storage, tape, optical storage, battery backed dynamic random access memory, battery backed static RAM, flash memory, etc. Various subroutines may also be provided. These subroutines may be parts of main routines in the form of static libraries, dynamic libraries, system device drivers or system services.

The machine-readable storage medium 400 is shown having al low level routine 402, which, when executed, manipulates units through various subroutines. The updating of a file, e.g. data object, as performed when the subroutines are executed is described above in regard to FIGS. 3A–3C, FIG. 4 and FIGS. 5A–5C. A write unit subroutine 404 writes data into a unit, a read unit subroutine 406 provides instructions for reading the data in the units New units may be created by executing a create units 408 subroutine. Furthermore, for truncating a unit, a truncate unit subroutine 410 may be presented. The units may be linked and marked as such by a link subroutine 412.

The low level routine 402 may communicate with a data object level routine 414 to manage the data objects. A combine units subroutine 416 is for relating all units together that comprise a particular data object. Where data is updated, an update handle subroutine 418 is for changing the handles used to combine all units for a data object. In addition, the medium 400 may have other software components, such as an operating system 420.

The software components may be provided in as a series of computer readable instructions that may be embodied as data signals in a carrier wave. When the instructions are executed, they cause a processor to perform the reliable updating file steps as described. For example, the instructions may cause a processor to copy fragments, create backup copies of sequence tables, change pointers and delete units. Such instructions may be presented to the processor by various mechanisms, such as a plug-in, static library, dynamic library, system device driver, system service, etc.

The present invention has been described above in varied detail by reference to particular embodiments and figures. However, these specifics should not be construed as limitations on the scope of the invention, but merely as illustrations of some of the presently preferred embodiments. It is to be further understood that other modifications or substitutions may be made to the described reliable file updating storage system as well as methods of its use without departing from the broad scope of the invention. The above-described steps of reliable updating may be performed in various orders. For example, in some embodiments a backup copy of a sequence table may be made prior to copying a fragment, rather than after fragment copying. Therefore, the following claims and their legal equivalents should determine the scope of the invention.

What is claimed is:

1. A method, comprising:
   receiving an instruction for updating a file having a plurality of fragments stored in a memory, the instruction including changed data for updating a first fragment of the file;
   creating a second fragment based on the first fragment and the changed data, the second fragment representing an updated version of the first fragment;
   copying a first table associated with the first fragment to form a second table, the second table having a handle referencing the second fragment;
   deleting the first fragment when the creating and copying operations are completed; and
   processing further accesses to the deleted first fragment using the second fragment via the second table.

2. The method of claim 1, further comprising marking, via the first table, the first fragment as invalid while the creating and copying operations are being performed.

3. The method of claim 2, further comprising:
   determining whether the instruction has been cancelled before the creating and copying operations are completed;
   marking the first fragment as valid if the instruction has been cancelled before the creating and copying operations are completed; and
   deleting the second fragment and the second table after marking the first fragment as valid.

4. The method of claim 1, further comprising deleting the first table when the creating and copying operations are completed.

5. The method of claim 1, further comprising marking, via the second table, the second fragment as a backup copy of the first segment while the creating and copying operations are being performed.

6. The method of claim 5, further comprising unmarking the second fragment as the backup copy of the first segment after the creating and copying operations are completed.

7. The method of claim 1, wherein the copying the first table comprises writing the handle into a replacement entry.

8. The method of claim 7, wherein the writing the handle comprises marking a handle pointing to the first fragment as invalid and marking the handle pointing to the second fragment as valid.

9. A method, comprising:

receiving an instruction for updating a file having a plurality of fragments stored in a memory, the instruction including changed data for updating a first fragment of the file;

creating a second fragment based on the first fragment and the changed data;

copying a first table associated with the first fragment to form a second table having a handle referencing the second fragment, the first table being a member of a first chain having a plurality of tables;

deleting the first fragment when the creating and copying operations are completed;

creating a copy for each of the plurality tables in the first chain to form a second chain, each of the copied table having a handle pointing to the next copied table in the second chain;

replacing the first chain with the second chain; and deleting the first chain.

10. The method of claim 9, wherein each table in the first and second chains is hierarchically ranked at a different level and wherein each table is capable of associating with one or more tables in the respective chain via one or more handles respectively.

11. A machine-readable medium having executable code to cause a machine to perform a method, the method comprising:

receiving an instruction for updating a file having a plurality of fragments stored in a memory, the instruction including changed data for updating a first fragment of the file;

creating a second fragment based on the first fragment and the changed data, the second fragment representing an updated version of the first fragment;

copying a first table associated with the first fragment to form a second table, the second table having a handle referencing the second fragment;

deleting the first fragment when the creating and copying operations are completed; and processing further accesses to the deleted first fragment using the second fragment via the second table.

12. The machine-readable medium of claim 11, wherein the method further comprises marking, via the first table, the first fragment as invalid while the creating and copying operations are being performed.

13. The machine-readable medium of claim 12, wherein the method further comprises:

determining whether the instruction has been cancelled before the creating and copying operations are completed;

marking the first fragment as valid if the instruction has been cancelled before the creating and copying operations are completed; and deleting the second fragment and the second table after marking the first fragment as valid.

14. The machine-readable medium of claim 11, wherein the method further comprises deleting the first table when the creating and copying operations are completed.

15. The machine-readable medium of claim 11, wherein the method further comprises marking, via the second table, the second fragment as a backup copy of the first segment while the creating and copying operations are being performed.

16. The machine-readable medium of claim 15, wherein the method further comprises unmarking the second fragment as the backup copy of the first segment after the creating and copying operations are completed.

17. The machine-readable medium of claim 11, wherein the copying the first table comprises writing the handle into a replacement entry.

18. The machine-readable medium of claim 17, wherein the writing the handle comprises marking a handle pointing to the first fragment as invalid and marking the handle pointing to the second fragment as valid.

19. A machine-readable medium having executable code to cause a machine to perform a method, the method comprising:

receiving an instruction for updating a file having a plurality of fragments stored in a memory, the instruction including changed data for updating a first fragment of the file;

creating a second fragment based on the first fragment and the changed data;

copying a first table associated with the first fragment to form a second table having a handle referencing the second fragment, the first table being a member of a first chain having a plurality of tables;

deleting the first fragment when the creating and copying operations are completed;

creating a copy for each of the plurality tables in the first chain to form a second chain, each of the copied table having a handle pointing to the next copied table in the second chain;

replacing the first chain with the second chain; and deleting the first chain.

20. The machine-readable medium of claim 19, wherein each table in the first and second chains is hierarchically ranked at a different level and wherein each table is capable of associating with one or more tables in the respective chain via one or more handles respectively.

21. A data storage system, comprising:

a processor;

a memory coupled to the processor;

a machine executable code, when executed by the processor from the memory, causes a data object manager to receive an instruction for updating a file having a plurality of fragments stored in the memory, the instruction including changed data for updating a first fragment of the file, create a second fragment based on the first fragment and the changed data, the second fragment representing an updated version of the first fragment, copy a first table associated with the first fragment to form a second table, the second table having a handle referencing the second fragment, delete the first fragment when the creating and copying operations are completed, process further accesses to the deleted first fragment using the second fragment via the second table.

22. The system of claim 21, wherein the data object manager further marks, via the first table, the first fragment as invalid while the creating and copying operations are being performed.

23. The system of claim 22, wherein the data object manager is further to:

determine whether the instruction has been cancelled before the creating and copying operations are completed;

mark the first fragment as valid if the instruction has been cancelled before the creating and copying operations are completed; and delete the second fragment and the second table after marking the first fragment as valid.

24. The system of claim 21, wherein the data object manager further deletes the first table when the creating and copying operations are completed.

25. The system of claim 21, wherein the data object manager further marks, via the second table, the second fragment as a backup copy of the first segment while the creating and copying operations are being performed.

26. The system of claim 25, wherein the data object manager further unmarks the second fragment as the backup copy of the first segment after the creating and copying operations are completed.

27. The system of claim 21, wherein the copying the first table comprises writing the handle into a replacement entry.

28. The system of claim 27, wherein the writing the handle comprises marking a handle pointing to the first fragment as invalid and marking the handle pointing to the second fragment as valid.

29. A data storage system, comprising:

a processor;

a memory coupled to the processor;

a machine executable code, when executed by the processor from the memory, causes a data object manager to receive an instruction for updating a file having a plurality of fragments stored in a memory, the instruction including changed data for updating a first fragment of the file, create a second fragment based on the first fragment and the changed data, copy a first table associated with the first fragment to form a second table having a handle referencing the second fragment, the first table being a member of a first chain having a plurality of tables, delete the first fragment when the creating and copying operations are completed, create a copy for each of the plurality tables in the first chain to form a second chain, each of the copied table having a handle pointing to the next copied table in the second chain, replace the first chain with the second chain, and delete the first chain.

30. The system of claim 29, wherein each table in the first and second chains is hierarchically ranked at a different level and wherein each table is capable of associating with one or more tables in the respective chain via one or more handles respectively.

* * * * *